United States Patent
Wintz et al.

(10) Patent No.: US 12,217,212 B2
(45) Date of Patent: Feb. 4, 2025

(54) OPTIMIZING TRUCK LOADING OF PALLETS

(71) Applicant: Lineage Logistics, LLC, Irvine, CA (US)

(72) Inventors: Daniel Thomas Wintz, San Francisco, CA (US); Julia Long, Durham, NC (US); Peter Greskoff, Boston, MA (US); Chloe Mawer, San Francisco, CA (US); Caitlin Voegele, San Francisco, CA (US); Daniel Walet, Oakland, CA (US); Elliott Gerard Wolf, San Francisco, CA (US)

(73) Assignee: Lineage Logistics, LLC, Irvine, CA (US)

( * ) Notice: Subject to any disclaimer, the term of this patent is extended or adjusted under 35 U.S.C. 154(b) by 147 days.

(21) Appl. No.: 17/896,000

(22) Filed: Aug. 25, 2022

(65) Prior Publication Data

US 2022/0414594 A1    Dec. 29, 2022

Related U.S. Application Data

(63) Continuation of application No. 16/688,906, filed on Nov. 19, 2019, now Pat. No. 11,429,925.

(51) Int. Cl.
*G06Q 10/083* (2024.01)
*G06Q 10/0631* (2023.01)

(52) U.S. Cl.
CPC ... *G06Q 10/0838* (2013.01); *G06Q 10/06315* (2013.01)

(58) Field of Classification Search
CPC ............. G06Q 10/0838; G06Q 10/06315
(Continued)

(56) References Cited

U.S. PATENT DOCUMENTS

| 8,386,397 B1 | 2/2013 | Agarwal |
| 2002/0123944 A1 | 9/2002 | Williams et al. |

(Continued)

FOREIGN PATENT DOCUMENTS

JP    2015005271    1/2015

OTHER PUBLICATIONS

"An approach for picking optimization in automated warehouse" to Tang et al, Jul. 15, 2009 (Year: 2009).*

(Continued)

*Primary Examiner* — Charles Guiliano
*Assistant Examiner* — Po Han Lee
(74) *Attorney, Agent, or Firm* — Barnes & Thornburg LLP

(57) ABSTRACT

This specification generally discloses technology for optimizing the loading of pallets on trucks and other sorts of vehicles. A pallet loading technique includes receiving pallet information for a shipment, the pallet information describing pallets to be included in the shipment, receiving vehicle constraint information for a vehicle, the vehicle constraint information describing rules for loading pallets on the vehicle, and determining candidate solutions for loading the pallets on the vehicle, each candidate solution (i) satisfying the rules for loading pallets on the vehicle, and (ii) defining, for each pallet to be included in the shipment, a respective position and orientation of the pallet on the vehicle. At least some of the candidate solutions are evaluated, one of the candidate solutions is selected, and the vehicle is loaded according to the selected candidate solution.

20 Claims, 14 Drawing Sheets

(58) Field of Classification Search
USPC .......................................................... 705/7.25
See application file for complete search history.

(56) References Cited

U.S. PATENT DOCUMENTS

| | | |
|---|---|---|
| 2014/0180958 A1 | 6/2014 | Arunapuram |
| 2014/0297553 A1 | 10/2014 | Benda et al. |
| 2015/0073588 A1 | 3/2015 | Priebe |
| 2017/0091704 A1 | 3/2017 | Wolf |
| 2018/0018619 A1* | 1/2018 | Kisiler ................. G06Q 10/083 |
| 2020/0019918 A1 | 1/2020 | Li |
| 2020/0039668 A1* | 2/2020 | Que .......................... B65B 5/12 |
| 2020/0039765 A1 | 2/2020 | Pankratov et al. |

OTHER PUBLICATIONS

International Preliminary Report on Patentability in International Appln. No. PCT/US2020/061303, dated Jun. 2, 2022, 9 pages.
International Search Report and Written Opinion in International Application No. PCT/US2020/061303, dated Jan. 29, 2021, 14 pages.
Tang et al., "An approach for picking optimization in automated warehouse," Fifth International Conference on Natural Computation, 2009, 5 pages.

* cited by examiner

OPTIMIZING TRUCK LOADING OF PALLETS

CROSS-REFERENCE TO RELATED APPLICATIONS

This application is a continuation of U.S. application Ser. No. 16/688,906, filed on Nov. 19, 2019. The disclosure of the prior application is considered part of (and is incorporated by reference in) the disclosure of this application.

TECHNICAL FIELD

This document generally relates to systems and methods for optimizing the loading of pallets on trucks.

BACKGROUND

Warehouses include warehouse racks to store pallets of goods. Pallets are generally flat transport structures that support goods in a stable manner and are adapted to fit various devices/machines to move the pallets. In general, preparing pallets for shipment on a truck can include retrieving the pallets from the warehouse racks, and using forklifts and/or other devices/machines to transport the pallets to a staging area near the truck. Before pallets are loaded onto trucks for transportation out of a warehouse, all of the pallets to be loaded onto a truck are gathered in the staging area and manually assessed by a warehouse worker to determine how to arrange the pallets within the truck. For example, trucks and their trailers can include various requirements and/or restrictions to ensure safe transport of pallets between locations, such as overall weight restrictions for the truck, weight restrictions for various portions of the trailer, and/or other constraints. To ensure safe and sufficient loading of a truck and its trailer, a worker with expert knowledge can assess the pallets in the staging area to figure out how to best load the truck trailer to comply with the truck and trailer requirements, which can be time consuming (e.g., pallets first need to be assembled in staging area, then manually assessed, then loaded, then tested and possibly rearranged) as well as labor intensive (e.g., manual labor to perform all steps).

SUMMARY

This document generally describes systems and methods for optimizing the loading of pallets on trucks and other sorts of vehicles, which can minimize and/or eliminate staging that is performed on a loading dock, minimize manual labor that is used to load a truck, reduce the overall labor that is performed to load a truck, and can decrease the time it takes to load trucks (which can decrease the "turn time" for trucks and can increase warehousing efficiency). For example, an optimal arrangement of pallets within a truck to provide for safe and secure transport of the pallets (e.g., complying with truck and trailer requirements, complying with best practices for safe transport of pallets within a truck) can be automatically determined and used to pull pallets sequentially from the warehouse so that they can be inserted directly into the truck without (and/or with minimal) staging in the staging area of the warehouse. For instance, a layout of pallets in a truck can be determined to comply with legal and other constraints, and dynamic pick and placement guidance can be provided to an automated warehouse system/devices so that the pallets are picked and arrive at the truck at an appropriate time (relative to other pallets in the truck) to be placed at a suitable location in a truck without having to be staged in the loading dock first. In an automated warehouse, for example, a command can be provided to pull a batch of pallets for a shipment.

The disclosed technology can also provide a robust solution that is able to still gain these efficacies (e.g., loading directly into truck without staging in loading dock and/or other efficiencies) in spite of potential delays or other hiccups that occur in the physical retrieval and delivery of pallets from the warehouse into the truck. For example, if pallets arrive out of order at a truck, the efficiencies of directly loading pallets into the truck may be partially lost by having to stage the out of order pallets in the loading area until the delayed pallets arrive. The pallets may or may not be delivered to the truck in an ideal order, for example, due to unpredicted variability that may occur while transporting the pallets to the truck. To accommodate and account for such issues, a pallet grouping solution can be used to provide loading flexibility while providing a near-optimal solution. For example, pallets can be grouped according to similar characteristics (e.g., weight and size) that permit pallets within the group to be swapped with each other within the truck while still complying with various loading requirements. When loading the truck, for example, pallets arriving out of order can simply be slotted into the next available location for their pallet group in the optimized pallet layout for the truck, which can permit for loading to continue unimpeded (or with minimal impediments) even though pallets may arrive out of order.

The disclosed technology also provides for efficient identification of optimal pallet layouts for a truck. For example, with a full trailer, a 53-foot truck can accommodate 30 pallets, which results in ~265 nonillion combinations to consider for loading the truck. A brute force analysis of all of these possible combinations to identify an optimal solution is inefficient and not computationally feasible for each truck to be loaded at a warehouse. The disclosed technology provides a way to quickly and efficiently arrive at an optimal solution for loading a truck that will permit for loading flexibility through pallet groupings while also complying with all loading requirements.

Particular embodiments described herein include a method for loading pallets on a vehicle. The method can include receiving pallet information for a shipment, the pallet information describing pallets to be included in the shipment, each pallet being associated with one or more pallet characteristics; receiving vehicle constraint information for the vehicle, the vehicle constraint information describing rules for loading pallets on the vehicle; determining candidate solutions for loading the pallets on the vehicle, each candidate solution (i) satisfying the rules for loading pallets on the vehicle, and (ii) defining, for each pallet to be included in the shipment, a respective position and orientation of the pallet on the vehicle; evaluating at least some of the candidate solutions; based on the evaluating, selecting one of the candidate solutions; and loading the vehicle according to the selected candidate solution.

Other implementations of this aspect include corresponding computer systems, and include corresponding apparatus and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other implementations can optionally include any, all, or none of the following features. The one or more pallet characteristics can include a pallet weight and a pallet size. The rules for loading pallets on the vehicle can include a rule that specifies a total weight of pallets to be loaded on the vehicle. The rules for loading pallets on the vehicle can include a rule that specifies a maximum height of pallets to be loaded on the vehicle. The rules for loading pallets on the vehicle can include a rule that specifies that a total weight of pallets to be loaded on a left side of the vehicle is to be substantially similar to a total weight of pallets to be loaded on a right side of the vehicle. The rules for loading pallets on the vehicle can include a rule that specifies two or more zones for the vehicle, with at least two of the zones being associated with different total weights of pallets to be loaded in the respective zone. The rules for loading pallets on the vehicle can include a rule that specifies that adjacent pallets to be loaded on the vehicle are to have substantially similar heights. Evaluating at least some of the candidate solutions can include determining, for each of the at least some of the candidate solutions, a respective solution cost, the solution cost representing an efficiency of the candidate solution with respect to loading the vehicle. The selected candidate solution can be selected based on its solution cost. Determining a solution cost for a candidate solution can include: (i) for each pallet to be included in the shipment, determining a pallet cost for loading the pallet on the vehicle according to its position and orientation defined in the candidate solution, and (ii) aggregating the pallet costs. For each pallet to be included in the shipment, the pallet can be assigned to a respective group based on its pallet characteristics, each group including pallets having substantially similar characteristics. A number of groups can be more than one and fewer than a number of pallets to be included in the shipment. Loading the vehicle according to the selected one of the candidate solution can include (i) identifying a first pallet to be loaded on the vehicle in a first slot according to the selected candidate solution, (ii) receiving a second pallet, the second pallet being different from the first pallet and to be loaded in a second, different slot according to the selected candidate solution, (iii) determining that the second pallet is assigned to a same group as the first pallet, and (iv) loading the second pallet on the vehicle in the first slot.

The disclosed systems and techniques may provide any of a variety of advantages. Pallets can be retrieved from storage locations such that the pallets arrive at a vehicle in an order that facilitates vehicle loading, thus minimizing a staging area and increasing efficiency. Minimizing staging areas can allow other warehouse areas (e.g., pallet storage areas) to be increased in a warehouse environment, improving use of warehouse space. Determining a preferred loading solution can include evaluating fewer than all possible solutions, conserving computational resources while identifying a loading solution that is suitable for practical purposes. Loading operations can be dynamically adjusted by swapping similar pallets according to determined pallet groups, improving operational flexibility.

The details of one or more implementations are set forth in the accompanying drawings and the description below. Other features and advantages will be apparent from the description and drawings, and from the claims.

DETAILED DESCRIPTION OF ILLUSTRATIVE EMBODIMENTS

This document describes systems and methods for optimizing the loading of pallets on trucks and other sorts of vehicles. In a warehouse environment, for example, goods can be transported by pallets carried by various sorts of pallet movers, such as pallet jacks, forklifts, and/or automated pallets movers such as automated guided vehicles (AGVs). Pallet movers, for example, can be used to unload pallets from vehicles (e.g., trucks, trailers, etc.), and transport the pallets to various storage locations in the warehouse. When the pallets are to be shipped, for example, the pallets can be retrieved from the storage locations and can be loaded on vehicles by pallet movers. In general, loading pallets on a vehicle may involve determining a configuration of pallets that satisfies various vehicle constraints (e.g., legal, physical, etc.). Rather than retrieving the pallets, moving the pallets to a staging area in proximity to the vehicle, determining the configuration, then loading the vehicle, for example, the configuration can be determined before retrieving the pallets, based on the vehicle constraints and pallet characteristics (e.g., weight, size, etc.). The pallets can be then be retrieved from the storage locations such that the pallets arrive at the vehicle in an order that facilitates vehicle loading, thus minimizing a size of the staging area and increasing loading efficiency. Further, the pallets can be grouped according to pallet characteristics, such that a pallet may potentially be swapped with another pallet in its group while loading the vehicle. Thus, should one or more pallets happen to arrive at the vehicle out of sequence, the loading operation may dynamically adjust and continue by swapping similar pallets according to the pallet groups, further increasing loading efficiency.

Figure 1:
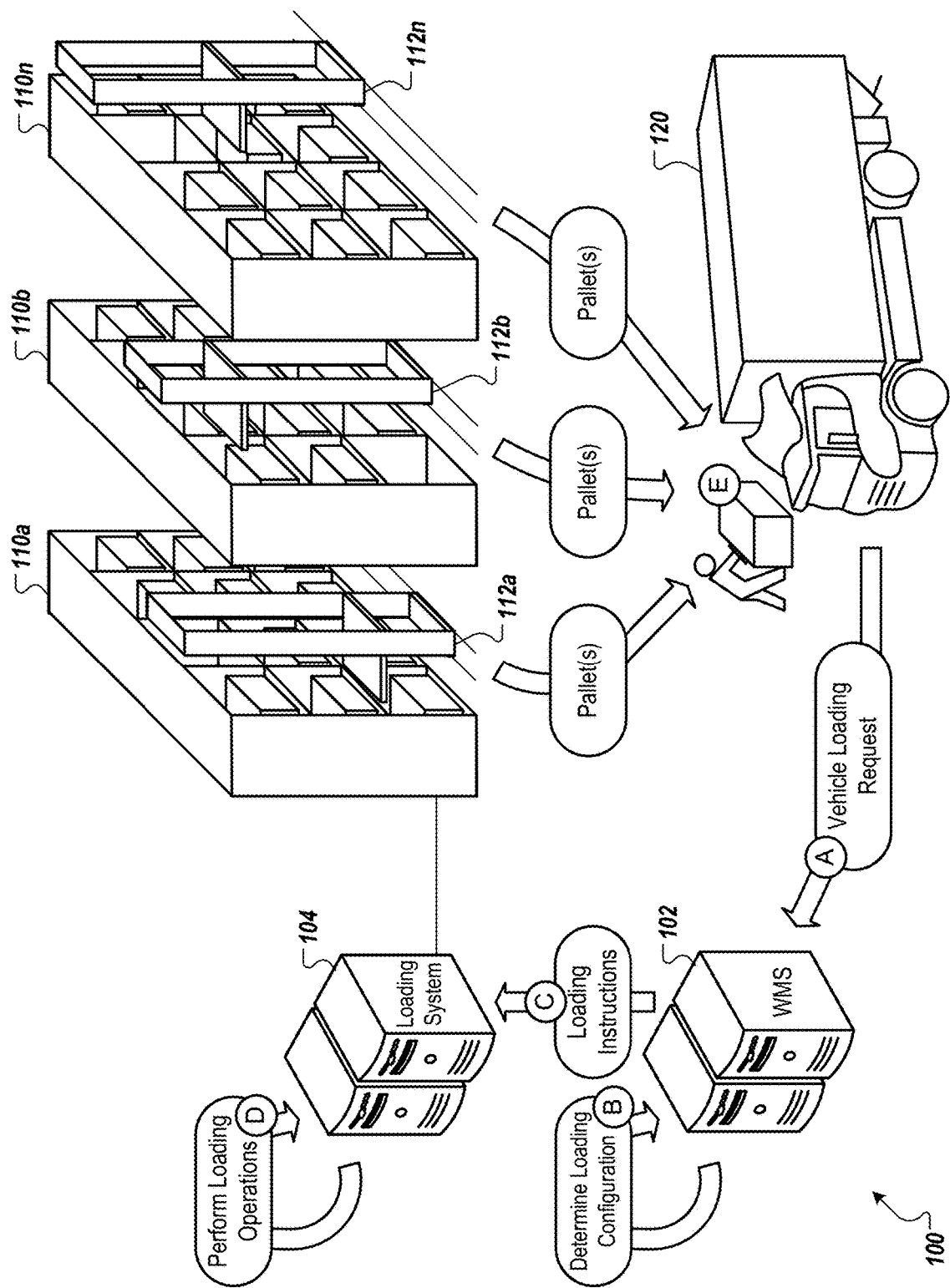
FIG. 1 depicts an example vehicle loading system for use in a warehouse environment.

FIG. 1 depicts an example vehicle loading system 100 for use in a warehouse environment. The system 100, for example, can include a warehouse management system 102 and a loading system 104. The warehouse management system 102, for example, can be used to support and optimize various warehouse functions. The loading system 104, for example, can be used to perform and/or coordinate loading/unloading operations in the warehouse environment. In some implementations, the loading system 104 can include, communicate with, and/or control an automated storage and retrieval system (ASRS) that automatically places pallets in and retrieves pallets from defined storage locations. For example, the warehouse environment can include various pallet storage areas 110a, 110b, 110n, etc., which can include pallets storage racks arranged in rows and columns. In the present example, one or more pallet handling devices 112a, 112b, 112n, etc., which can include elevator and/or conveyor devices configured to place pallets in and retrieve pallets from specific storage locations in the pallet storage areas 110a, 110b, 110n, etc.

In the depicted example, the warehouse management system 102 and the loading system 104 can each include one or more computing servers, including but not limited to network servers, web servers, application servers, or other suitable computing servers. In some examples, the warehouse management system 102 and the loading system 104 can include different computing servers, and can communicate over one or more communication networks (not shown), including a LAN (local area network), a WAN (wide area network), and/or the Internet. In some examples, the warehouse management system 102 and the loading system 104 can be integrated into a single system and/or can include one or more same computing servers. To perform operations, for example, the warehouse management system 102 and the loading system 104 can access data from various sources (e.g., databases, file systems, and/or cached data sources), can execute software that processes the accessed data, and can provide information based on the processed data to various output devices (e.g., display screens, audio speakers, printers, etc.) to various users (e.g., warehouse workers).

FIG. 1 also illustrates an example process flow for optimizing the loading pallets on vehicles (e.g., trucks), shown in stages (A) to (E). Stages (A) to (E) may occur in the illustrated sequence, or they may occur in a sequence that is different than in the illustrated sequence, and/or two or more stages (A) to (E) may be concurrent.

During stage (A), for example, the warehouse management system 102 can receive and/or generate a vehicle loading request. The vehicle loading request, for example, can include a list of goods and/or pallets to be included in a shipment to be transported by a vehicle 120 (e.g., a truck). The goods/pallets, for example, can be associated with various characteristics, such as weight, size, and other suitable characteristics.

During stage (B), for example, the warehouse management system 102 can determine a loading configuration for loading the goods and/or pallets on the vehicle 120. For example, the vehicle 120 can be associated with various vehicle constraints (e.g., legal, physical, etc.), such as weight limits of goods/pallets to be loaded on the vehicle 120, size limits of goods/pallets to be loaded on the vehicle 120, and other suitable constraints. The warehouse management system 120, for example, can identify characteristics of the goods/pallets to be loaded (e.g., weight, size, etc.), and based on the identified characteristics, can determine a configuration for loading the goods/pallets that satisfies the constraints of the vehicle 120.

During stage (C), for example, the warehouse management system 102 can provide loading instructions to the loading system 104. The loading instructions, for example, can include a list of goods and/or pallets, possibly sequenced according to the determined configuration for loading the goods/pallets. For example, goods/pallets that are to be loaded first on the vehicle 120 can be listed first (e.g., goods/pallets to be loaded on the front of a truck according to the loading configuration), and goods/pallets that are to be loaded last on the vehicle 120 can be listed last (e.g., goods/pallets to be loaded on the back of the truck according to the loading configuration). In some implementations, loading instructions may include requested arrival times for goods and/or pallets. For example, the warehouse management system 102 can request that a first pallet arrive for loading on the vehicle 120 at a first time, that a second pallet arrive for loading on the vehicle 120 at a second time, and so forth. An interval between pallet arrival times, for example, can be based on projected loading times for the pallets, such that pallets can be loaded on the vehicle 120 as the pallets arrive.

During stage (D), for example, the loading system 104 can perform various loading operations for moving goods and/or pallets included in the list of goods/pallets, according to the loading instructions. For example, the loading system 104 can instruct an automated storage and retrieval system (ASRS) to retrieve a particular pallet from one of the pallet storage areas 110a-n, and one of the pallet handling devices 112a-n can retrieve the pallet and provide the pallet for transportation to the vehicle 120 by one or more pallets movers, such as pallet jacks, forklifts, and/or automated pallets movers such as automated guided vehicles (AGVs). As another example, the loading system 104 can output instructions for manual retrieval of a particular pallet and transportation of the pallet to the vehicle 120 by a pallet jack, forklift, or other suitable manually operated pallet mover.

During stage (E), for example, goods and/or pallets to be included in the shipment can be transported from the various pallet storage areas 110a-n to the vehicle 120 for loading. For example, pallets may generally arrive at the vehicle 120 according to the loading instructions performed by the loading system 104 (e.g., with goods/pallets to be loaded first arriving first, and goods/pallets to be loaded last arriving last), to facilitate efficient loading of the goods/pallets on the vehicle 120. However, in warehouse environments that include multiple different pallet storage areas and multiple different pallets movers, and that are configured to concurrently load and/or unload multiple different vehicles, goods/pallets may occasionally arrive out of sequence. Should one or more pallets happen to arrive at the vehicle 120 out of sequence, for example, the loading operation may dynamically adjust and continue by swapping similar pallets according to determined pallet groups, as described in further detail below.

Figure 2A:
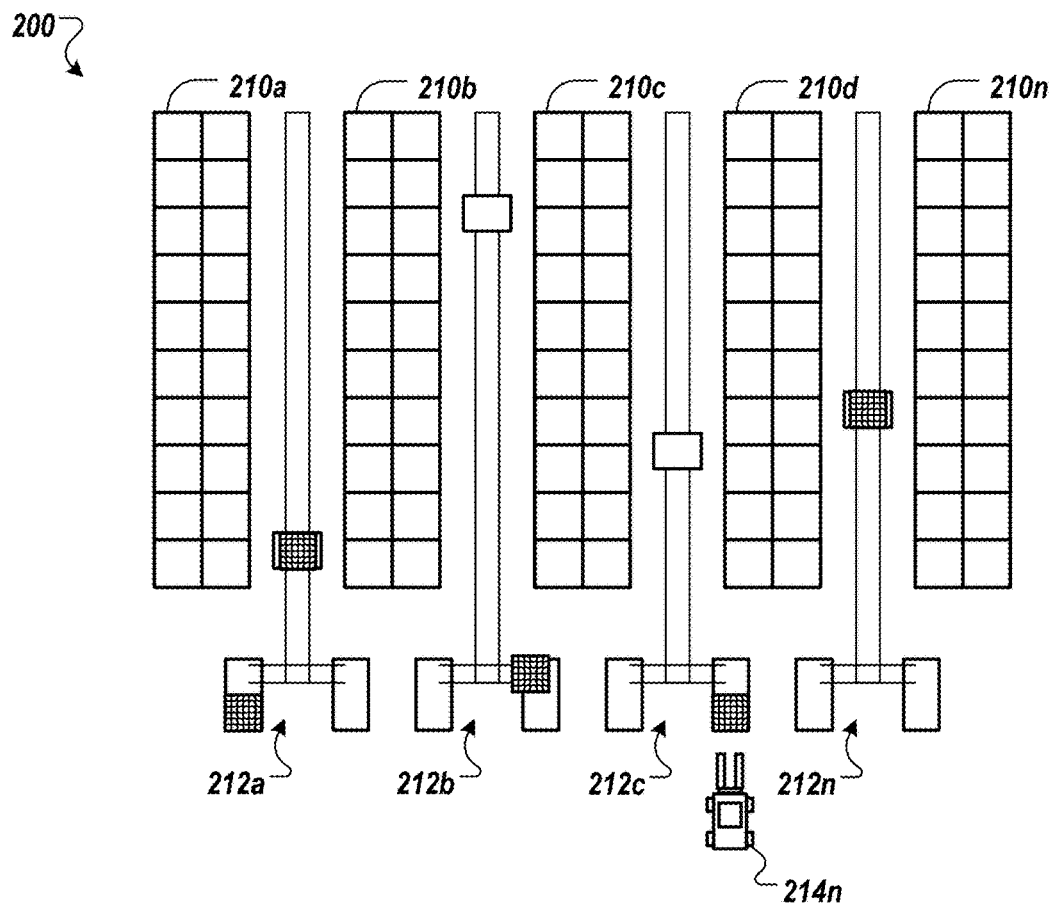
FIGS. 2A-B depict example warehouse environments.
Figure 2A:
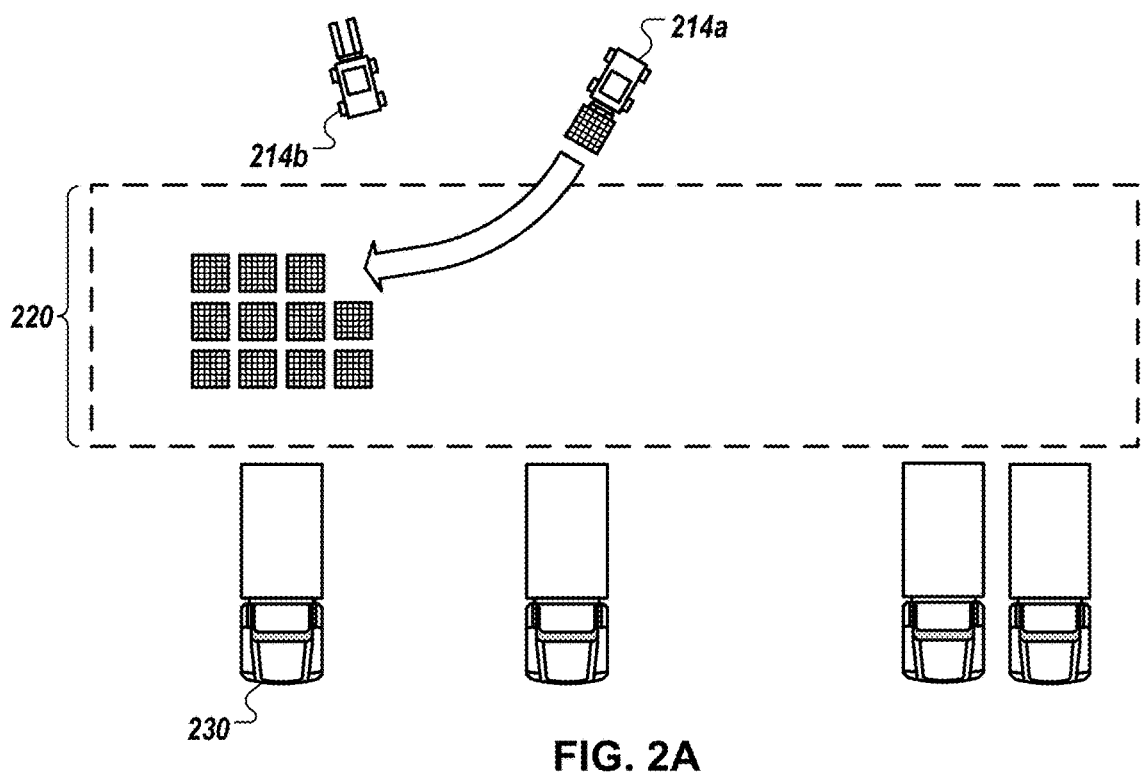
Figure 2B:
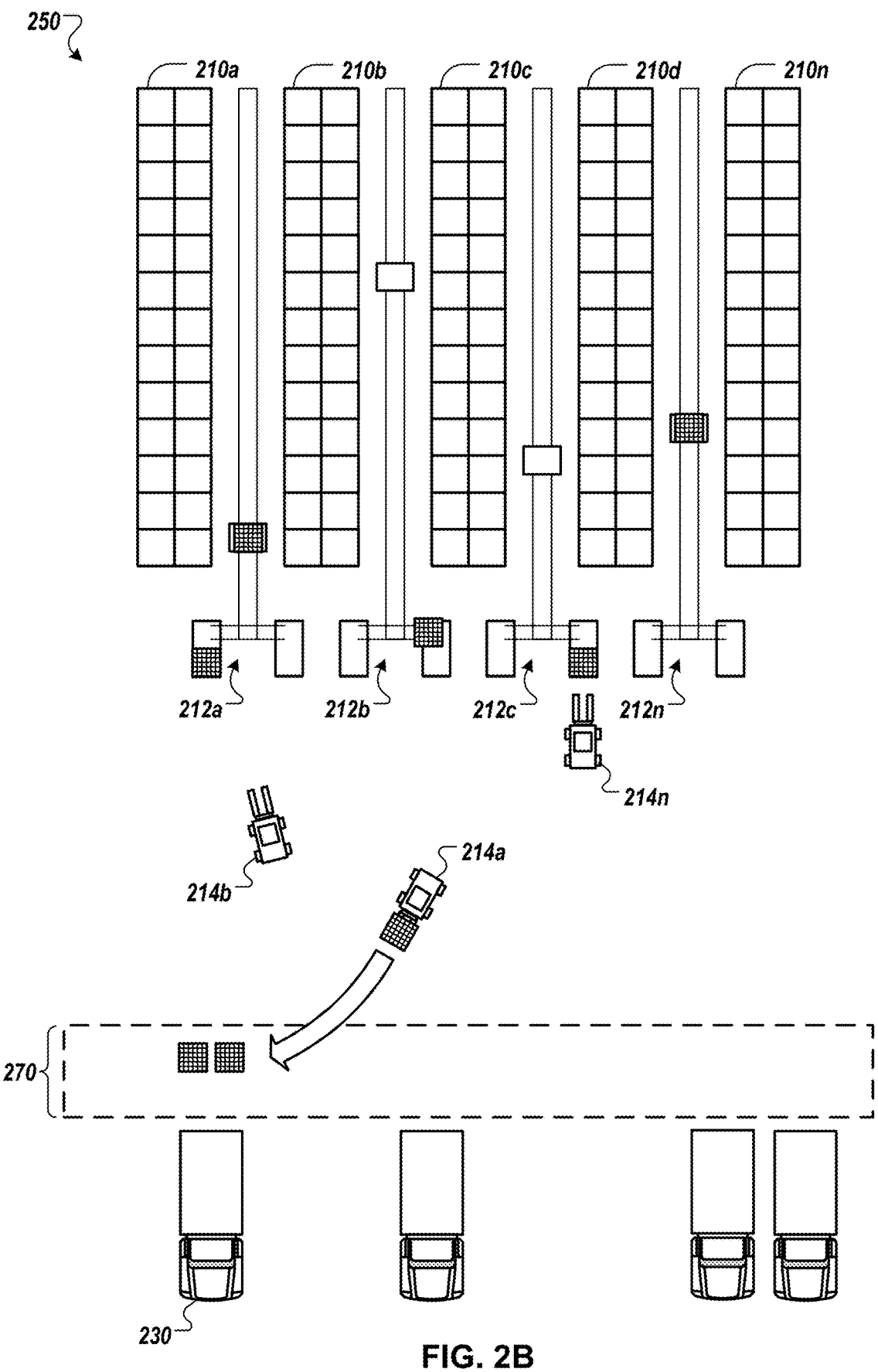

FIGS. 2A-B depict example warehouse environments 200, 250. Each of the example warehouse environments 200, 250, for example, include various pallet storage areas 210a-e (e.g., similar to pallet storage areas 110a-n, shown in FIG. 1), and various pallet handling devices 212a-n (e.g., similar to pallet handling devices 112a-n, also shown in FIG. 1). When goods and/or pallets are to be shipped, for example, the pallet handling devices 212a-n can retrieve pallets for shipment from storage locations in the pallet storage areas 210a-e, and can provide the pallets for pickup and transport by various pallet movers 214a-n (e.g., pallet jacks, forklifts, and/or automated pallet movers such as automated guided vehicles (AGVs). The pallet movers 214a-n, for example, can transport pallets to staging areas (e.g., loading/unloading areas) in which the pallets are to be temporarily gathered for eventual loading on vehicles, by the same pallet movers 214*a-n*, or possibly by other pallet movers (e.g., pallet movers configured to load/unload pallets on vehicles). As another example, the pallet movers 214*a-n* can load pallets on the vehicles, without first transporting the pallets to a staging area.

Referring to FIG. 2A, an example is shown of staging a shipment without first determining a loading configuration for pallets included in the shipment. In the present example, the warehouse management system 102 (shown in FIG. 1) can provide a list of pallets included in the shipment to the loading system 104 (also shown in FIG. 1), in no particular order. The pallet handling devices 212*a-n* can retrieve the pallets, for example, and the pallet movers 214*a-n* can each pick up pallets retrieved by the pallet handling devices 212*a-n*, transport the pallets to a staging area 220, drop off the pallets, pick up additional pallets, and so forth, until all of the pallets included in a shipment have been delivered to the staging area 220. After the pallets have been delivered to the staging area 220, for example, a worker in the warehouse environment 200 can evaluate the pallets in the staging area (e.g., with respect to size and weight), determine a loading configuration that satisfies constraints of a truck 230 (e.g., based on expert knowledge), and then load the truck 230 according to the determined configuration. However, loading configurations determined through expert knowledge occasionally may not fully satisfy vehicle constraints (e.g., when estimated weights/sizes of goods/pallets are inaccurate), and vehicles may need to be reloaded to correct problems that may occur (e.g., when detected by a weigh station or another evaluation system).

Referring now to FIG. 2B, an example is shown of first determining a loading configuration for pallets to be included in a shipment, then retrieving and loading the pallets. In the present example, the warehouse management system 102 (shown in FIG. 1) can determine a suitably accurate configuration for loading pallets included in the shipment (e.g., based vehicle constraints and pallet characteristics), and can request that the loading system 104 (also shown in FIG. 1) retrieve the pallets such that the pallets are delivered in a manner that facilitates loading of the pallets on the truck 230 according to the determined loading configuration. For example, particular pallets or pallets of a particular group that are to be loaded on the truck 230 first can be delivered to a staging area 270 first, and particular pallets or pallets of a particular group that are to be loaded on the truck 230 last can be delivered to the staging area 270 last. Since the loading configuration has been predetermined by the warehouse management system 102, for example, it is not necessary for workers in the warehouse environment 250 to wait until all of the pallets to be included in the shipment to arrive in the staging area 270 before loading the pallets on the truck 230. On the contrary, workers may begin loading pallets on the vehicle 270 as soon as the first pallet arrives in the staging area 270, for example, and may continue loading pallets as additional pallets arrive, until all of the pallets included in the shipment have been loaded. As another example, the pallet movers 214*a-n* can be used to load pallets directly on the truck 230 rather than deliver the pallets to the staging area 270. As a result of predetermining accurate loading configurations and specifying an order in which pallets are to arrive for loading, for example, vehicle loading times may be decreased, reloading incidents may be decreased, and staging areas used for loading vehicles may be decreased or eliminated. As shown in FIGS. 2A-B, for example, decreasing staging area 220 to staging area 270 can allow pallet storage areas 210*a-e* to be increased in respective warehouse environments 200, 250, thus improving use of warehouse space.

Figure 3:
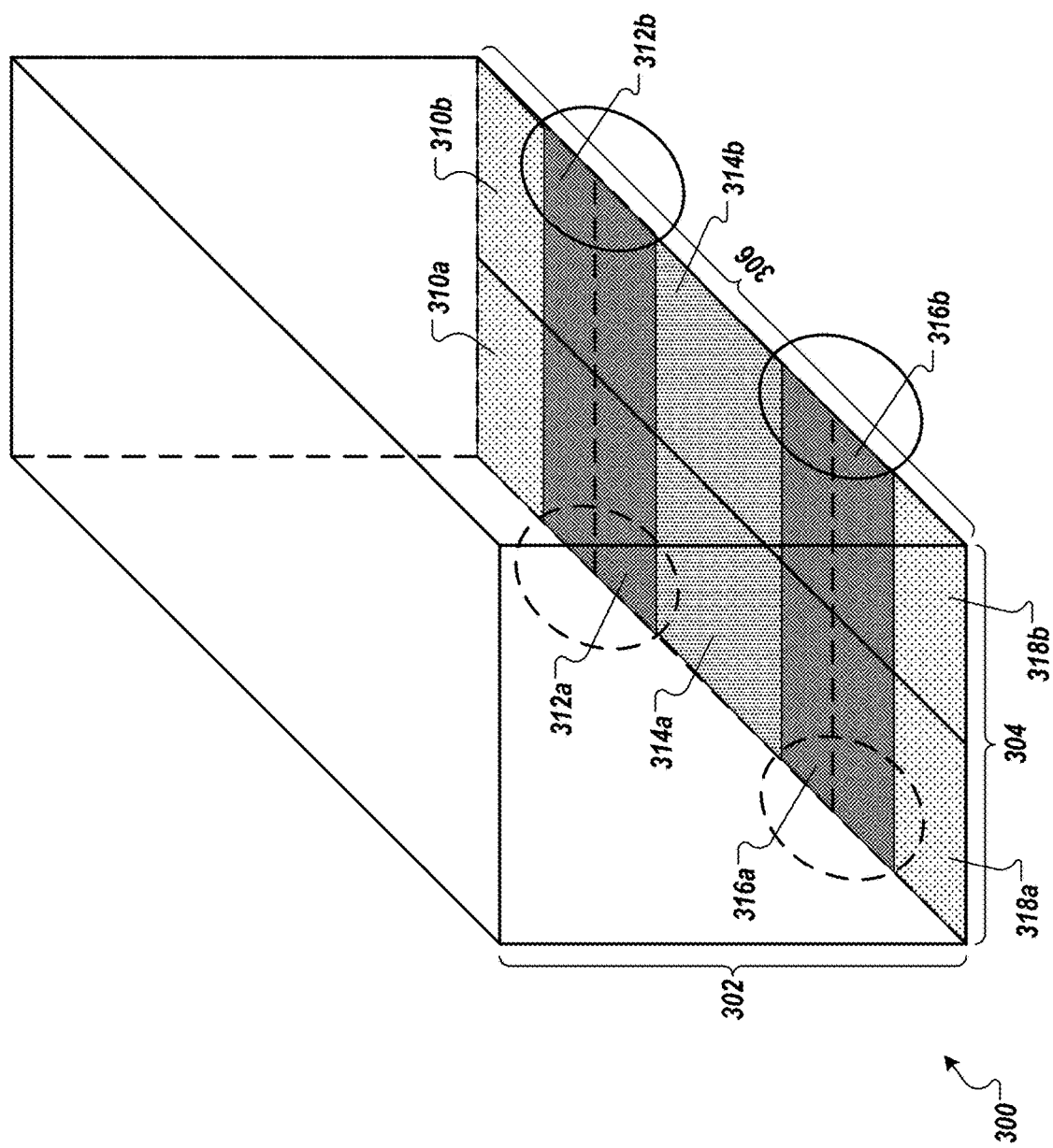
FIG. 3 is a conceptual illustration of an example vehicle for transporting pallets.

FIG. 3 is a conceptual illustration of an example vehicle 300 for transporting pallets. In general, a vehicle (e.g., a truck, trailer, or other suitable vehicle for transporting goods and/or pallets) can be associated with vehicle constraint information that describes rules for loading goods and/or pallets on the vehicle. For example, legal regulations can specify total weight limits for goods/pallets to be transported by the vehicle and/or weight limits of goods/pallets over each vehicle axle. In order for the vehicle 300 to legally transport goods/pallets using public roads, for example, the goods/pallets are to be arranged on the vehicle 300 such that the appropriate legal constraints are satisfied. As another example, physical vehicle constraints can also include weight limits (e.g., based on vehicle specifications), and can include size dimensions of a cargo transportation area of the vehicle. In the present example, the cargo transportation area of the vehicle 300 includes a height 302, a width 304, and a length 306. To satisfy the physical vehicle constraints of the vehicle 300, for example, goods/pallets are to be arranged such that a total height of the goods/pallets does not exceed the vehicle height 302, a total width of the goods/pallets does not exceed the vehicle width 304, and a total length of the goods/pallets does not exceed the vehicle length 306, when the goods/pallets are loaded according to the loading configuration.

In some implementations, a cargo transportation area of a vehicle can be logically partitioned in to multiple zones, each zone being associated with one or more zone-specific vehicle constraints. For example, the vehicle 300 can be partitioned into zone 310*a* (e.g., left front), zone 310*b* (e.g., right front), zone 312*a* (e.g., left front axle), zone 312*b* (e.g., right front axle), zone 314*a* (e.g., left middle), zone 314*b* (e.g., right middle), zone 316*a* (e.g., left rear axle), zone 316*b* (e.g., right rear axle), zone 318*a* (e.g., left rear), and zone 318*b* (e.g., right rear). Each of the zones 310*a-b*, 312*a-b*, 314*a-b*, 316*a-b*, and 318*a-b*, for example, can be associated with vehicle constraints that are based on best practices for arranging goods/pallets in a vehicle with respect to height and weight distribution, such that goods/pallets may be safely transported in the vehicle without damaging the goods/pallets or the vehicle. For example, zones over the axles (e.g., zones 312*a-b* and zones 316*a-b*) may be associated with a vehicle constraint that specifies that a weight of goods/pallets loaded in the zones is to be relatively heavy with respect to a total weight of goods/pallets, and zones that are not over the axles (e.g., zones 310*a-b*, 314*a-b*, and 318*a-b*) may be associated with a vehicle constraint that specifies that a weight of goods/pallets loaded in the zones is to be relatively light with respect to the total weight of goods/pallets. As another example, vehicle balance constraints may be defined such that horizontally adjacent zones (e.g., zone 310*a* and zone 310*b*, zone 312*a* and zone 312*b*, etc.) are to be loaded with goods/pallets having substantially similar heights and weights (e.g., within a threshold percentage, such as five percent, ten percent, twenty percent, or another suitable threshold percentage value).

Figure 4:
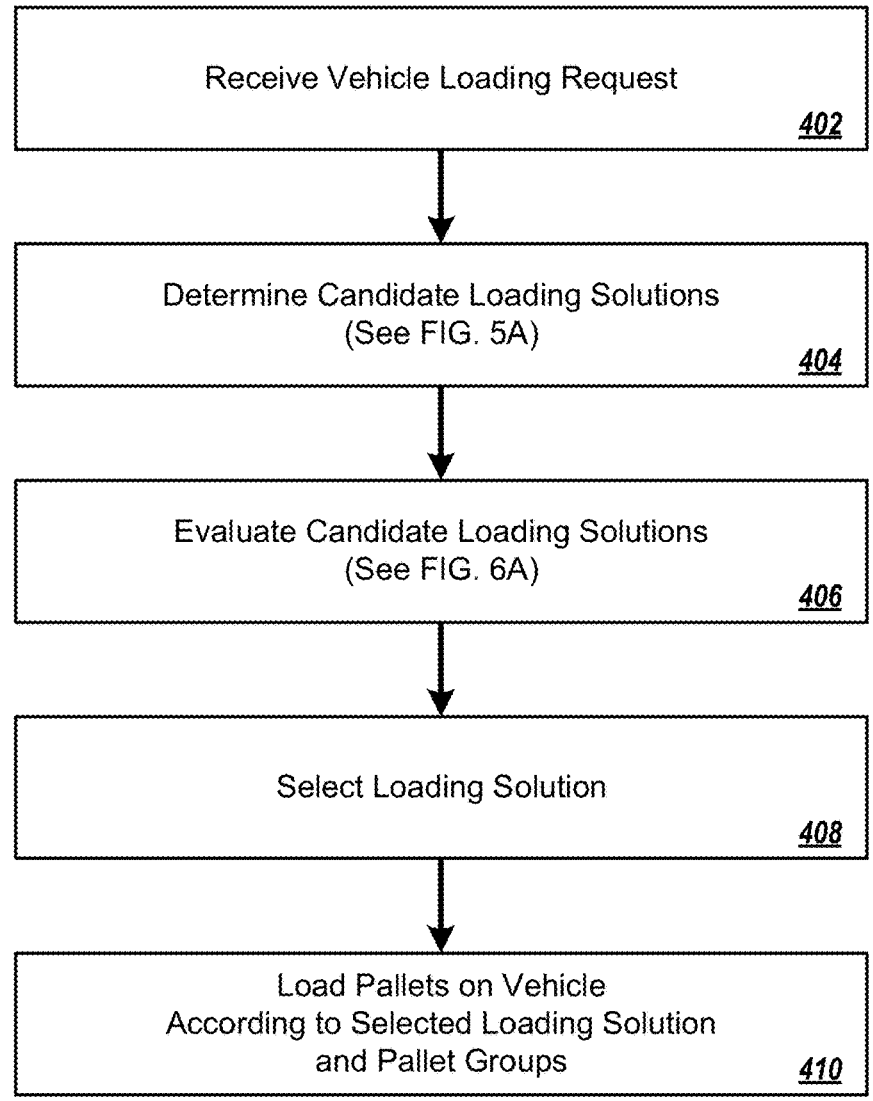
FIG. 4 is a flow diagram of an example process for optimizing the loading of pallets on a vehicle.

FIG. 4 is a flow diagram of an example process 400 for optimizing the loading of pallets on a vehicle. The process 400 can be performed by components of the system 100, for example, and will be described with reference to FIG. 1. However, other systems may be used to perform the same or similar process.

A vehicle loading request can be received (402). Referring to FIG. 1, for example, the warehouse management system 102 can receive and/or generate a vehicle loading request that pertains to a shipment of pallets to be loaded on vehicle 120.

Figure 5A:
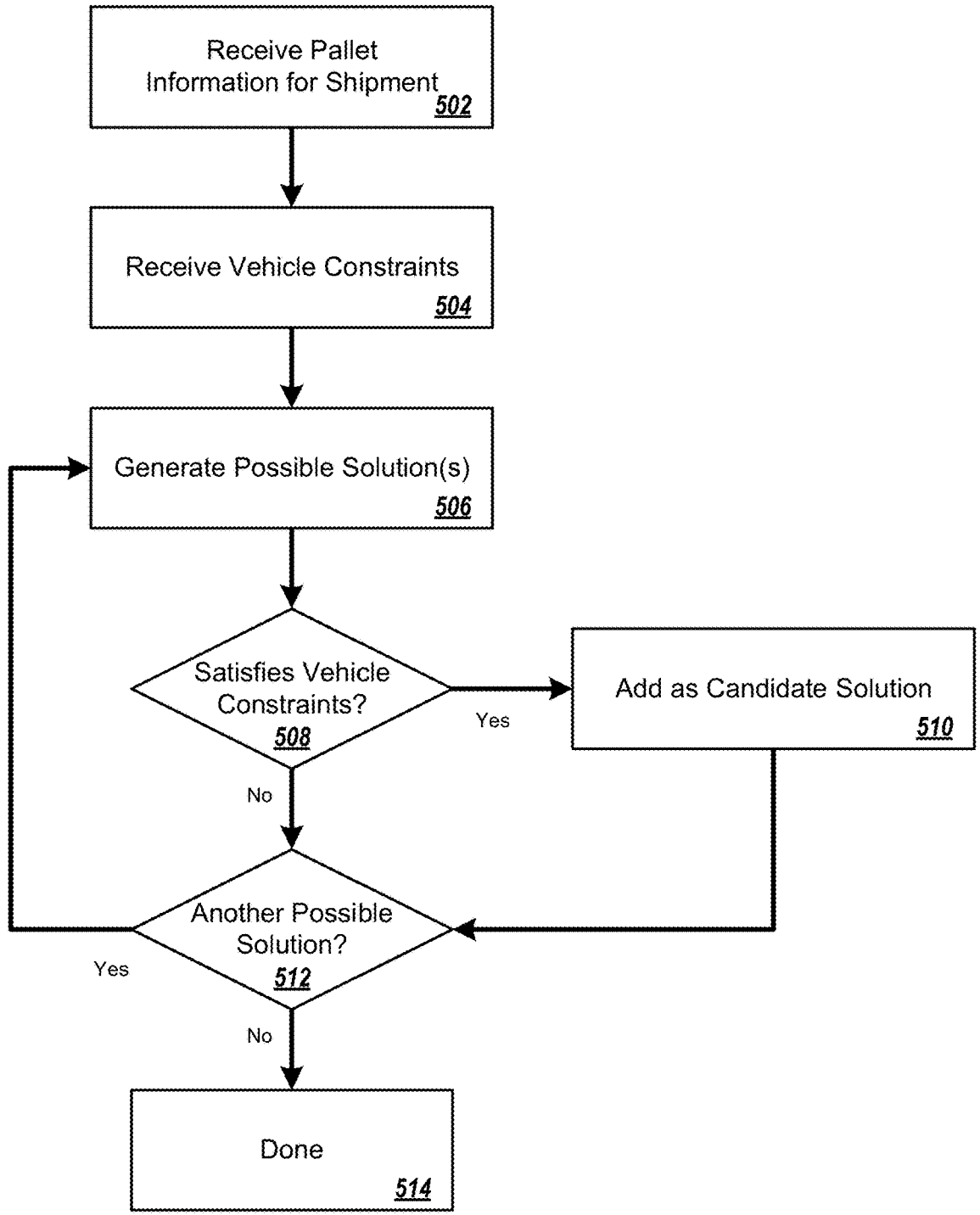
FIG. 5A is a flow diagram of an example process for generating candidate loading solutions.

Candidate loading solutions can be determined (404). For example, in response to the vehicle loading request, the warehouse management system 102 can determine various candidate loading solutions for loading the pallets on vehicle 120. Referring now to FIG. 5A, a flow diagram of an example process 500 for generating candidate loading solutions is shown.

Figure 5B:
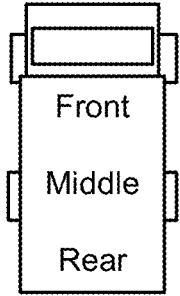
FIG. 5B is a conceptual illustration of example pallet information, vehicle constraints, and possible loading solutions.
Figure 5B:
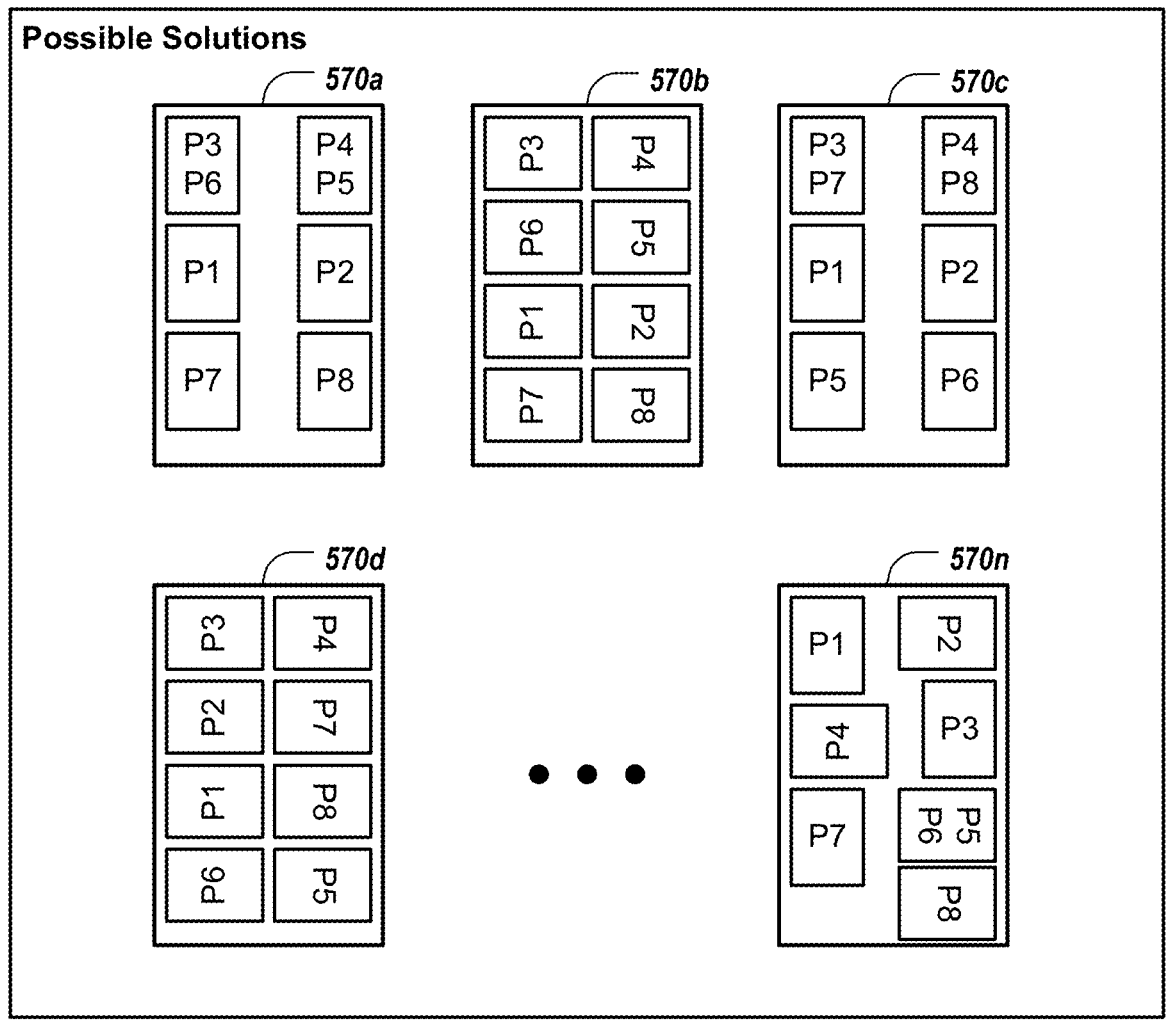

Pallet information can be received for a shipment (502). For example, the warehouse management system 102 can identify pallet information 550 (shown in FIG. 5B) that describes various pallets to be included in the shipment, each pallet being associated with one or more pallet characteristics. In some implementations, the one or more pallet characteristics may include a pallet weight (e.g., indicating a total weight of the pallet and goods on the pallet) and a pallet size (e.g., indicating a total size of the pallet and goods on the pallet). For example, as pallets loaded with goods are received and stored in a warehouse environment, the warehouse management system 102 can use various measuring devices (e.g., scales, cameras, etc.) to measure the pallet characteristics and store the characteristics in association with a pallet identifier. As another example, the warehouse management system 102 can identify goods on pallets, and can calculate the pallet characteristics by aggregating characteristics of the pallet and characteristics of the goods (e.g., adding a weight of the pallet and a weight of all the goods on the pallet, according to stored weight data). In the present example, the pallet information 550 for the shipment indicates that pallet P1 has a weight of 1000 pounds and a height of 72 inches, pallet P2 has a weight of 950 pounds and a height of 72 inches, pallet P3 has a weight of 300 pounds and a height of 36 inches, pallet P4 has a weight of 275 pounds and a height of 36 inches, pallet P5 has a weight of 325 pounds and a height of 36 inches, pallet P6 has a weight of 600 pounds and a height of 36 inches, pallet P7 has a weight of 600 pounds and a height of 72 inches, and pallet P8 has a weight of 575 pounds and a height of 72 inches. Each of the pallets P1-P8, for example, can have a similar length and width (e.g., 48"×40", or another set of dimensions), however, in other examples different pallets may have different length and width dimensions, and such pallet characteristics may be associated with the pallets.

Vehicle constraints can be received for a vehicle (504). For example, the warehouse management system 102 can identify vehicle constraints 560 (shown in FIG. 5B) that describes rules for loading pallets on the vehicle 120 (e.g., coded heuristics based on legal and/or physical factors that pertain to the vehicle's use). In some implementations, rules for loading pallets on a vehicle may include a rule that specifies a total weight of pallets to be loaded on the vehicle. For example, some vehicles may be designed to transport heavier loads than other vehicles and/or may operate in jurisdictions with different laws regarding maximum vehicle weights. In the present example, the vehicle 120 can be associated with a constraint that indicates that a total weight of goods/pallets loaded on the vehicle is to be less than 5000 pounds. In some implementations, rules for loading pallets on a vehicle may include a rule that specifies a maximum height of pallets to be loaded on the vehicle. For example, some vehicles may be designed to transport taller pallets than other vehicles. In the present example, the vehicle 120 can be associated with a constraint that indicates that a maximum height of goods/pallets loaded on the vehicle is to be under 84 inches. In some implementations, rules for loading pallets on a vehicle may include a rule that specifies that a total weight of pallets to be loaded on a left side of the vehicle is to be substantially similar to a total weight of pallets to be loaded on a right side of the vehicle (e.g., with respect to the overall weight distribution and/or a weight distribution within one or more defined zones). Weights that are substantially similar, for example, can be within a threshold percentage of each other, such as five percent, ten percent, twenty percent, or another suitable threshold percentage value. Balancing a vehicle load between left and right sides of the vehicle 120 can improve drivability, improve safety, and reduce wear, for example. In some implementations, rules for loading pallets on a vehicle may include a rule that specifies that adjacent pallets to be loaded on the vehicle (e.g., pallets that are adjacent from side to side and/or from front to back) are to have substantially similar heights. Heights that are substantially similar, for example, can be within a threshold percentage of each other, such as five percent, ten percent, twenty percent, or another suitable threshold percentage value. Arranging pallets on the vehicle 120 such that adjacent pallets are of substantially similar heights, for example, can prevent pallets from tipping during transport, thus reducing damage to goods. In some implementations, rules for loading pallets on a vehicle may include a rule that specifies two or more zones for the vehicle, with at least two of the zones being associated with different total weights of pallets to be loaded in the respective zone. For example, some vehicles may be designed such that heavier weights are better supported over the vehicle's axles, and lighter weights are better supported in other zones (e.g., at the front and/or back of the vehicle). In the present example, the vehicle 120 can be associated with a constraint that indicates that a zone over the vehicle's axle (e.g., a middle zone) is to be loaded with heavier goods/pallets than other zones.

Possible solutions for loading a vehicle can be generated (506). For example, the warehouse management system 102 can generate various possible loading solutions 570a-n (shown in FIG. 5B) for loading pallets on the vehicle 120, then evaluate the loading solutions. As another example, each of the possible loading solutions 570a-n can be generated and evaluated in turn. In general, vehicles may be designed to transport a number of pallets, and each of the pallets in a shipment may be loaded on the vehicle in each possible pallet position and orientation, such that the pallets may be loaded according to a vast number of different possible combinations. Further, rectangular pallets may be turned sideways and/or pallets may be stacked such that a number of pallets loaded on the vehicle (and a number of possible loading solutions) may be increased. In some implementations, generating possible solutions for loading a vehicle may include determining random permutations of different pallet loading configurations. For example, the warehouse management system 102 can randomly determine the possible loading solutions 570 according to the size characteristics of the pallets to be included in the shipment and the dimensions of the cargo transportation area of the vehicle 120, such that the pallets may fit on the vehicle.

A determination of whether a possible loading solution satisfies vehicle constraints can be performed (508). For example, the warehouse management system 102 can determine whether each of the possible loading solutions 570a-n satisfies the vehicle constraints 560. If a possible loading solution satisfies the vehicle constraints 560, for example, the loading solution can be added as a candidate loading solution (510). Each of the candidate loading solutions can satisfy the rules for loading the pallets on the vehicle, and can define, for each pallet to be included in the shipment, a respective position and orientation of the pallet on the vehicle. A determination of whether additional possible loading solutions are to be generated and/or evaluated can be performed (512), and if so, the process 500 can continue at (506), and if not, the process can end at (514). For example, the process 500 can iterate until all possible loading solutions are generated and evaluated, or can iterate until a subset (e.g., a fixed number or portion) of all possible solutions are generated and evaluated. For cases in which generating all possible solutions and/or evaluating the solutions may be computationally prohibitive, for example, the subset of possible solutions can be generated and evaluated to identify suitable candidate loading solutions, and the candidate loading solutions can be further evaluated to identify a preferred loading solution among the candidate loading solutions. The preferred loading solution, for example, may or may not be an optimal solution across all possible solutions, but may be suitable for practical purposes, and may be determined in a sufficient amount of time using a reasonable amount of computational resources.

Based on evaluating each of the possible loading solutions 570a-n in view of the vehicle constraints 560, for example, some of the possible loading solutions 570a-n may satisfy the vehicle constraints 560 and thus may be added as candidate loading solutions, whereas others may not satisfy the vehicle constraints 560 and thus may be discarded. In the present example, possible loading solutions 570a and 570b satisfy all of the vehicle constraints 560 and can be added as candidate solutions, whereas possible loading solutions 570c-n do not. Possible loading solution 570c, for example, includes stacking pallets P3 (36 inches) and P7 (72 inches), and thus does not satisfy the pallet height constraint of having a total pallet height of less than 84 inches. Possible loading solution 570d, for example, includes loading pallets P3 (300 pounds), P2 (950 pounds), P1 (1000 pounds), and P6 (300 pounds) on the left side of vehicle 120 (for a total of 2550 pounds), and pallets P4 (275 pounds), P7 (600 pounds), P8 (575 pounds), and P5 (325 pounds) on the right side of the vehicle 120 (for a total of 1775 pounds), and thus does not satisfy the vehicle balance constraint. Possible loading solution 570n, for example, includes loading pallets P1 (1000 pounds) and P2 (950 pounds) in a front zone of the vehicle 120 (for a total of 1950 pounds), pallets P4 (275 pounds) and P3 (300 pounds) in a middle zone of the vehicle 120 (for a total of 575 pounds), and pallets P7 (600 pounds), P5 (325 pounds), P6 (300 pounds), and P8 (575 pounds) in a rear zone of the vehicle 120 (for a total of 1800 pounds), and thus does not satisfy the vehicle constraint of having a heavy middle section (e.g., over the axle).

Figure 6A:
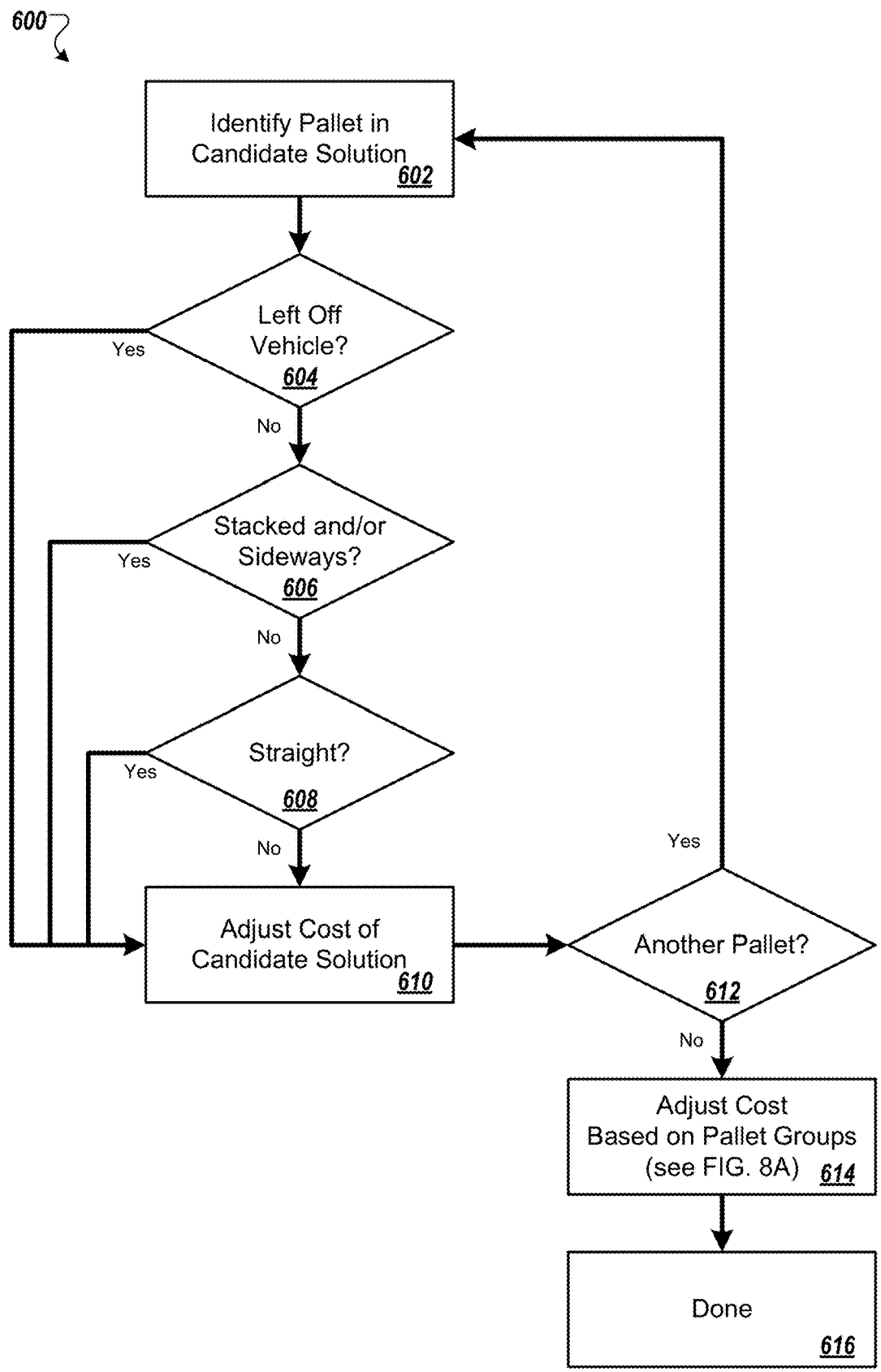
FIG. 6A is a flow diagram of an example process for determining a cost for a candidate loading solution.

Referring again to FIG. 4, candidate loading solutions can be evaluated (406). For example, after determining the candidate loading solutions for loading the pallets on vehicle 120, the warehouse management system 102 can evaluate the candidate loading solutions. In some implementations, evaluating a candidate loading solution may include determining a solution cost for the candidate loading solution that represents its efficiency with respect to loading a vehicle. Referring now to FIG. 6A, a flow diagram of an example process 600 for determining a cost for a candidate loading solution is shown.

Figure 6B:
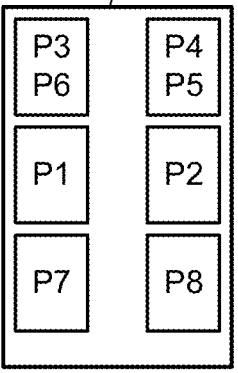
FIG. 6B is a conceptual illustration of determining costs for candidate loading solutions.

A pallet can be identified in a candidate loading solution (602). For example, the warehouse management system 102 can identify the position and orientation of each of the pallets according to the candidate loading solution 670a (shown in FIG. 6B), and according to the candidate loading solution 670b (also shown in FIG. 6B). The candidate loading solution 670a, for example, corresponds to the possible loading solution 570a shown in FIG. 5B, and the candidate loading solution 670b corresponds to the possible loading solution 570b shown in FIG. 5B. When identifying and evaluating a pallet in a candidate loading solution, for example, the warehouse management system 102 can compare the position and orientation of the pallet against various criteria, such as whether the pallet was left off the vehicle (604), whether the pallet is stacked and/or positioned sideways (606), and/or whether the pallet is positioned straight (608). Based on the position and orientation of the pallet with respect to the criteria, a cost of the candidate solution can be adjusted (610). The process can be repeated for each pallet identified in the candidate solution (612) until all pallets have been evaluated.

In some implementations, determining a solution cost for a candidate loading solution may include, for each pallet to be included in a shipment, determining a pallet cost for loading the pallet on a vehicle according to its position and orientation defined in the candidate loading solution, and aggregating the pallet costs. In general, pallet costs may represent an amount of time and/or effort needed to load individual pallets on the vehicle, and the solution cost may represent an overall time/effort needed to load all of the pallets according to the candidate loading solution. In some examples, a higher cost can correspond to a greater amount of time/effort, whereas a lower cost can correspond to a lesser amount of time/effort, however other cost determination schemes are possible. Each of the process criteria (604), (606), and (608), for example, can be associated with a cost value. In the present example, leaving a pallet off a vehicle can be associated with high cost value (e.g., one thousand), stacking a pallet on another pallet can be associated with a moderate cost value (e.g., six), positioning a pallet sideways on the vehicle can be associated with a lesser moderate cost value (e.g., four), and positioning a pallet straight on the vehicle can be associated with a low or negligible cost value (e.g., zero). According to the cost determination scheme in the present example, the candidate loading solution 670a can be associated with loading costs 680a, which includes pallet costs of six for each of pallets P3 and P4 (e.g., based on the pallets being stacked on respective pallets P6 and P5 according to the loading solution 670a), and an aggregated solution cost of twelve. Further, according to the cost determination scheme in the present example, the candidate loading solution 670b can be associated with loading costs 680b, which includes pallet costs of four for each of pallets P1-P8 (e.g., based on the pallets being positioned sideways according to the loading solution 670b), and an aggregated solution cost of thirty-two.

Figure 8A:
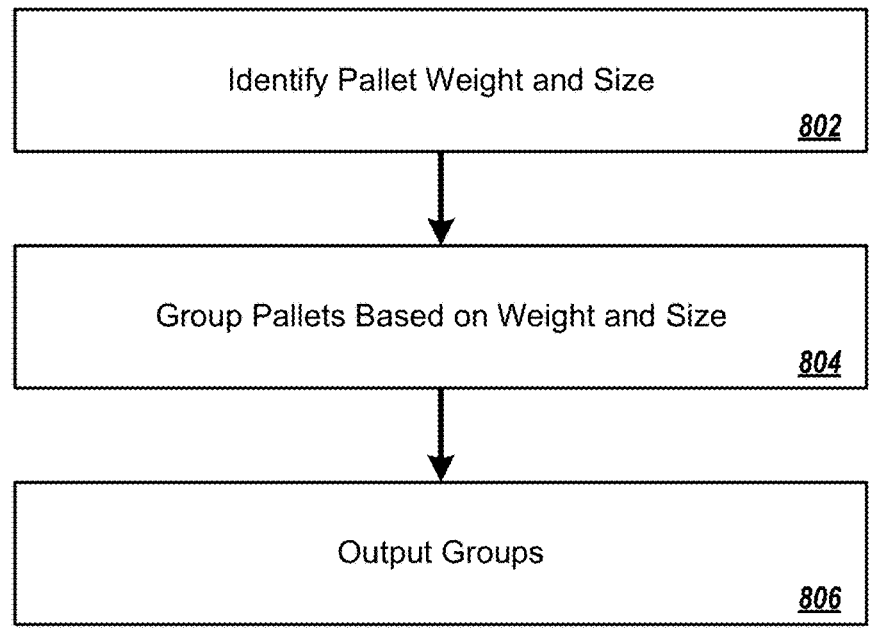
FIG. 8A is a flow diagram of an example process for determining pallet groups.

Pallet groups for a candidate loading solution can be determined, and a cost of the candidate loading solution can be adjusted based on a number of pallet groups (614). For example, the warehouse management system 102 can group the pallets P1-P8 in the selected candidate loading solution 670a (shown in FIG. 6B). In general, pallets to be included in a shipment may be grouped based on their pallet characteristics, with each group including pallets having substantially similar characteristics. For the purpose of loading a vehicle, for example, selecting a candidate solution having a lower number of groups may be preferable to selecting a candidate solution having a higher number of groups, as a greater number of pallets may be fungible in the solution having the lower number of groups. Thus, a cost of a candidate loading solution having a relatively low number of groups can be adjusted relatively lower, and a cost of a candidate loading solution having a relatively high number of groups can be adjusted relatively higher. After determining a number of pallet groups for the candidate loading solution, for example, the process 600 can be completed (616). Referring now to FIG. 8A, for example, a flow diagram of an example process 800 for determining pallet groups is shown.

Figure 8B:
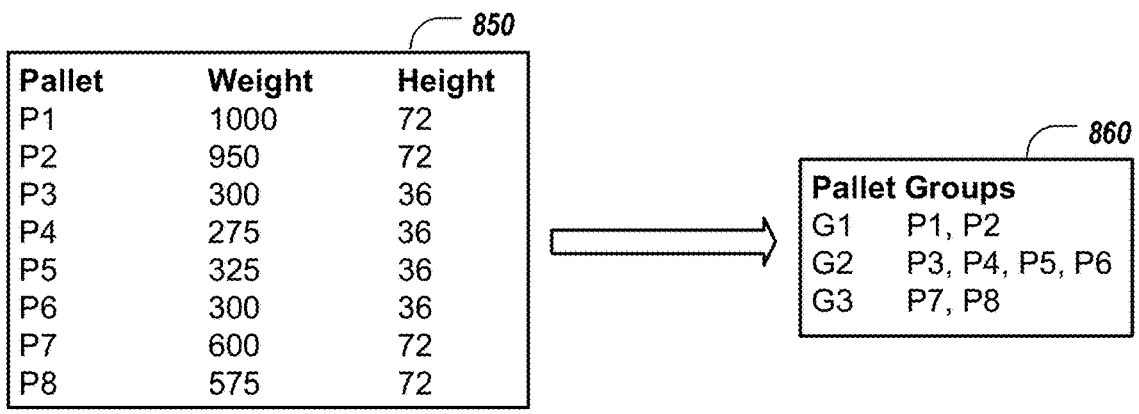
FIG. 8B is a conceptual illustration of determining pallet groups, and applying pallet groups to a selected loading solution.
Figure 8B:
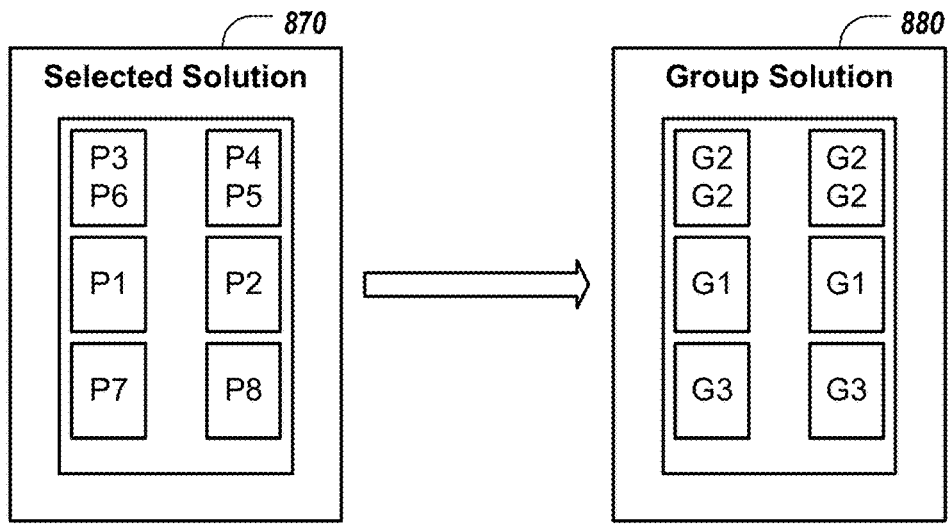

Pallet weights and sizes can be identified (802). For example, the warehouse management system 102 can identify pallet information 850 (shown in FIG. 8B, and similar to the pallet information 550 shown in FIG. 5B) that describes the pallets P1-P8 in selected loading solution 870 (also shown in FIG. 8B, and similar to the selected candidate loading solution 670a shown in FIG. 6B) that are to be included in the shipment on the vehicle 120.

Pallets can be grouped based at least in part on weight and size (804). For example, the warehouse management system 102 can identify various groups of pallets having substantially similar weights and heights (e.g., having weights and heights that are each within a threshold percentage of the weights and heights of other pallets in a group, such as five percent, ten percent, twenty percent, or another suitable threshold percentage value). As another example, various clustering techniques may be used to identify the groups of pallets.

Pallet groups can be output (806). For example, the warehouse management system 102 can output the pallet groups 860 (shown in FIG. 8B) for use in loading pallets on the vehicle 120 as the pallets arrive. In the present example, pallets P1 and P2 are grouped into group G1, pallets P3, P4, P5, and P6 are grouped into group G2, and pallets P7 and P8 are grouped into group G3. In some implementations, a group loading solution may be determined for a selected loading solution. For example, the warehouse management system 102 can generate group loading solution 880 based on selected loading solution 870 and the pallet groups 860. As each of pallets P3, P4, P5, and P6 belong to group G2 in the present example, any of the pallets may be swapped with any other of the pallets when the pallets are loaded on the vehicle 120. Similarly, each of pallets P1 and P2 belonging to group G1 may be swapped for the other, and each of pallets P7 and P8 belonging to group G3 may be swapped for the other, in the present example, according to the group loading solution 880.

Referring again to FIG. 4, one of the candidate loading solutions can be selected (408). In some implementations, a preferred candidate solution may be selected based on its solution cost. For example, the candidate loading solution 670a (shown in FIG. 6B) can be selected instead of the candidate loading solution 670b (also shown in FIG. 6B), based on the solution 670a having a lower solution cost, which indicates that the solution 670a may take less time and/or effort to implement.

Figure 7A:
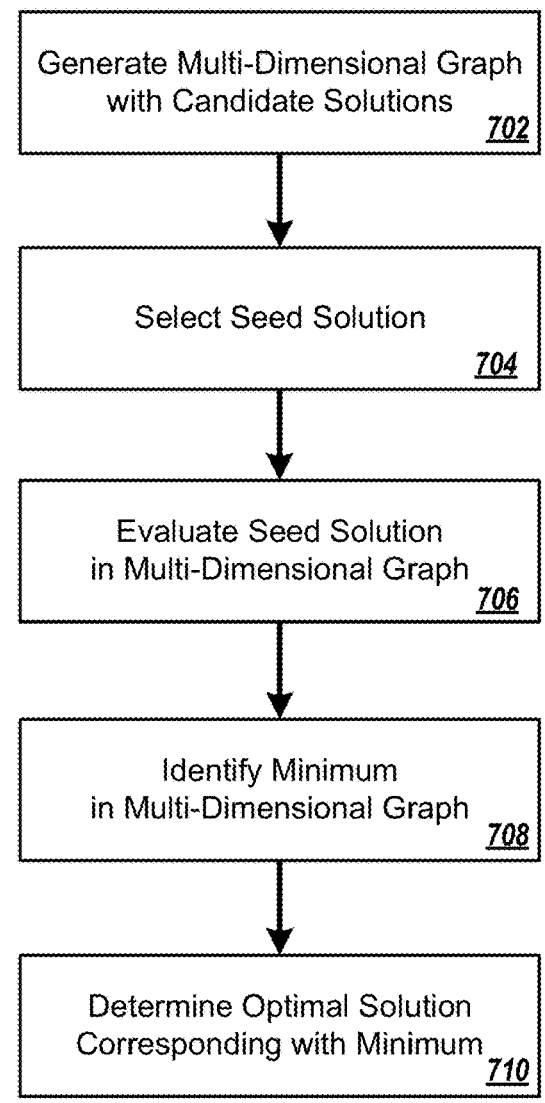
FIG. 7A is a flow diagram of an example process for using a multi-dimensional graph to determine an optimal candidate loading solution.

In some implementations, selecting one of the candidate loading solutions may include determining an optimal loading solution. Referring now to FIG. 7A, an optimal loading solution can be determined using an example iterative optimization algorithm 700. In general, determining the optimal loading solution may include evaluating costs for loading pallets on a vehicle according to a plurality of candidate loading solutions. As described herein, each of the candidate loading solutions is designed to satisfy the various constraints of the vehicle to be loaded, such as total weight, maximum pallet height, having similar pallet heights for adjacent pallets, load balancing, load distribution, and other suitable vehicle constraints. The costs associated with the candidate loading solutions may generally include costs that represent the efficiency of the respective candidate loading solutions if the solution were to be implemented (e.g., with respect to time, effort, and/or resources used to load pallets on a vehicle).

Figure 7B:
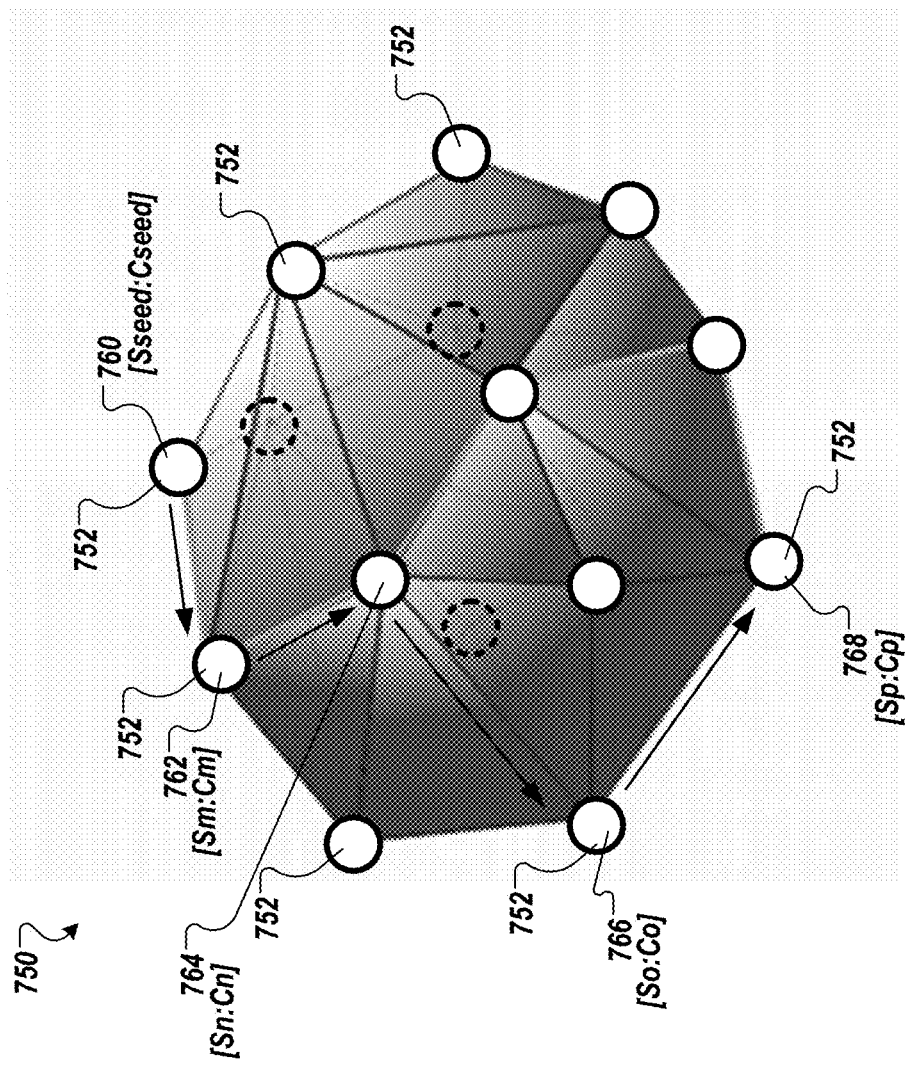
FIG. 7B is a conceptual illustration of an example multi-dimensional graph that represents a plurality of candidate loading solutions.

At 702, a multi-dimensional graph is generated, which provides the costs for loading pallets on a vehicle according to the plurality of candidate loading solutions. In some implementations, the dimension of the graph can be determined at least by the number of vehicle constraints considered when determining the candidate loading solutions. A conceptual illustration of an example multi-dimensional graph is shown in FIG. 7B.

At 704, a seed solution is selected from the plurality of candidate loading solutions. The seed solution can be selected randomly among the plurality of candidate loading solutions. Alternatively or in addition, the seed solution can be selected to satisfy one or more predetermined requirements which are associated with the candidate loading solutions.

At 706, the seed solution is evaluated in the multi-dimensional graph using an optimization algorithm. In some implementations, a cost of the seed solution can be compared to the costs of the plurality of candidate solutions to identify one of the plurality of candidate solutions having a minimal cost among all or a subset of the plurality of candidate solutions. For example, a cost of the seed solution is compared to the cost of a first one of the candidate solutions. If the cost of the seed solution is smaller than the cost of the first one of the candidate solutions, the seed solution is compared with the cost of a second one of the candidate solutions to determine which of the seed solution and the second one of the candidate solutions is smaller. If the cost of the seed solution is greater than the cost of the first one of the candidate solutions, the first one of the candidate solutions is then compared with the cost of a second one of the candidate solutions to determine which of the first one and the second one is smaller. This process can repeated until one of the plurality of candidate solutions is identified having a minimal cost.

At 708, a minimum is identified in the multi-dimensional graph using the optimization algorithm. In some implementations, a local minimum in the multi-dimensional graph is identified using an iterative optimization algorithm. The local minimum indicates the minimum value with a predetermined range in the multi-dimensional graph. Such a predetermined range in the multi-dimensional graph can be adjusted.

At 710, a loading solution among the candidate loading solutions, which corresponds with the identified minimum, is determined as an optimal loading solution. Where a local minimum is identified, one of the candidate loading solutions that corresponds with the local minimum is determined as an optimal loading solution.

FIG. 7B is a conceptual illustration of an example multi-dimensional graph 750 that represents a plurality of candidate loading solutions. The graph 750 has a plurality of vertices 752 that correspond with candidate loading solutions. The vertices 752 are also associated with costs of the respective candidate loading solutions. As described herein, the costs can represent efficiency of the respective candidate loading solutions when the respective candidate loading solutions are used to load pallets on a vehicle. The costs can be calculated based on one or more pallet loading factors, such as whether a pallet is left off a vehicle, whether a pallet is stacked and/or sideways, or whether a pallet is loaded straight, when using the respective candidate loading solution.

In the graph 750, a vertex 760 is selected as a seed solution, which has $C_{seed}$ as its cost. The seed solution (e.g., vertex 760) is compared with adjacent vertices to determine that a vertex 762 (corresponding to loading solution $S_m$ having cost $C_m$) has a smallest cost among the vertex 760 and its adjacent vertices. Then, the vertex 762 is compared with adjacent vertices to determine that a vertex 764 (corresponding to loading solution $S_n$ having cost $C_n$) has a smallest cost among the vertex 762 and its adjacent vertices. Then, the vertex 764 is compared with adjacent vertices to determine that a vertex 766 (corresponding to loading solution $S_o$ having cost $C_o$) has a smallest cost among the vertex 764 and its adjacent vertices. Lastly, the vertex 766 is compared with adjacent vertices to determine that a vertex 768 (corresponding to loading solution $S_p$ having cost $C_p$) has a smallest cost among the vertex 766 and its adjacent vertices. The vertex 768 is determined as having the minimal cost (or the local minimum) in the graph 750, and thus the loading solution $S_p$ is selected as an optimal loading solution for loading the pallets on the vehicle.

Referring again to FIG. 4, pallets can be loaded on the vehicle according to the selected loading solution and the determined pallet groups (410). For example, when a pallet arrives at the vehicle 120, the pallet can be identified by a warehouse worker (e.g., using a scanning device or another suitable pallet identification device), and the selected loading solution 870 can be accessed to determine whether the pallet is to be currently loaded on the vehicle (e.g., a current slot to be filled on the vehicle 120 corresponds to the pallet's identifier). If the pallet is to be currently loaded, for example, the worker can load the pallet on the vehicle 120. However, even if the pallet is not to be currently loaded on the vehicle 120 according to the selected loading solution 870, the pallet may be loaded anyway based on its group. For example, when a pallet arrives at the vehicle 120 out of sequence, the pallet's group can be identified according to the pallet groups 860, and the pallet may be loaded in place of another pallet belonging to the same group as the arriving pallet according to the group loading solution 880, such that pallets arriving out of sequence may be efficiently handled. For example, according to the selected loading solution 870, pallet P6 (e.g., belonging to group G2) is shown as being in a first slot, stacked underneath pallet P3. However, if another pallet belonging to a same group (e.g., group G2) were to first arrive at the vehicle 120 (e.g., any of pallets P3, P4, or P5) the pallet could be loaded in the first slot instead of pallet P6. Since all of the pallets P3, P4, P5, and P6 belong to the same group G2, for example, the pallets may be considered to be interchangeable when loading the vehicle 120 according to the group loading solution 880. Thus, rather than loading the pallets according to one specific configuration, the pallets may be loaded according to a more flexible configuration.

Figure 9:
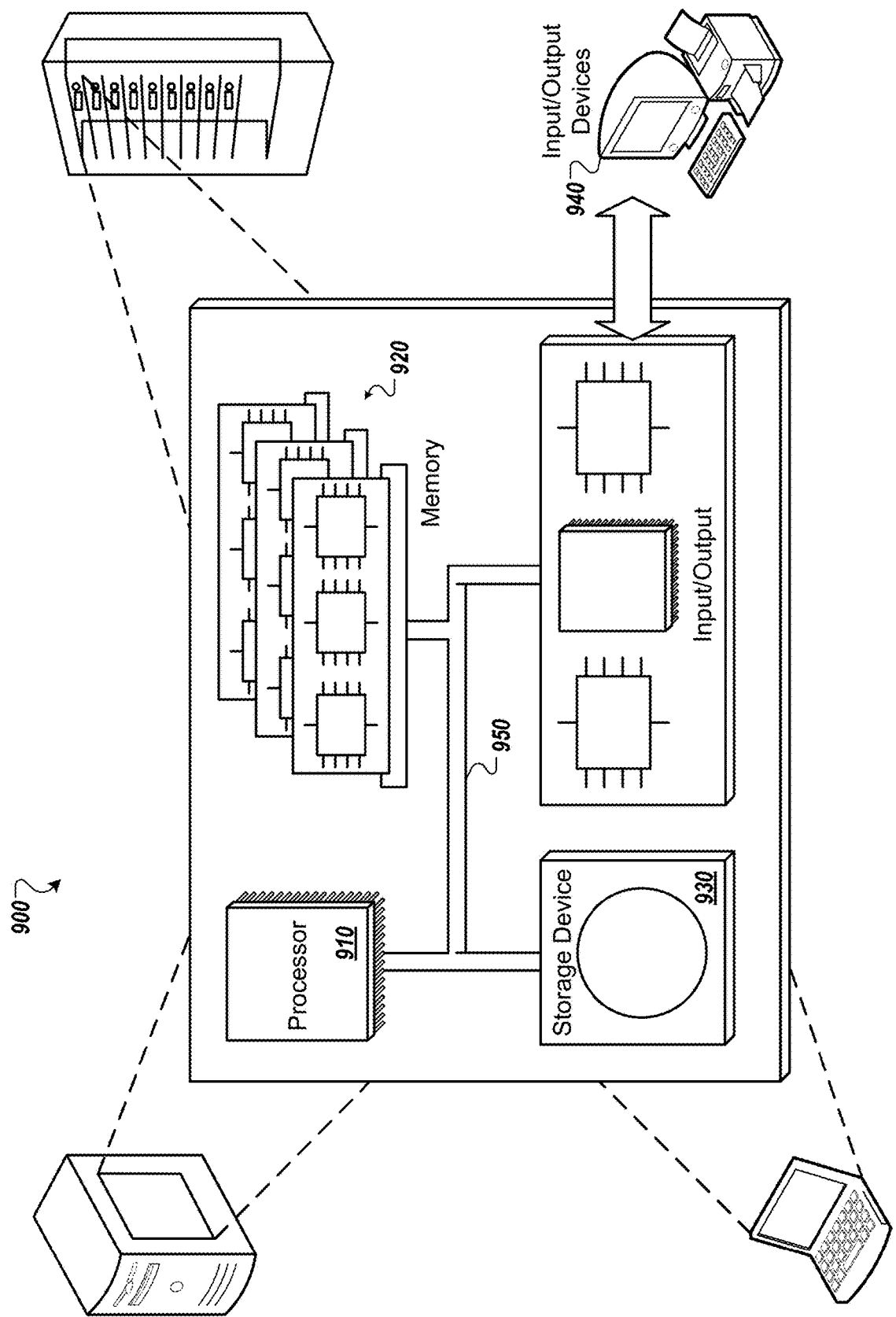
FIG. 9 is a schematic diagram of an example computer device that may be used to implement the systems and methods described in this document.

FIG. 9 is a schematic diagram of an example computer device 900 that may be used to implement the systems and methods described in this document. The device 900, for example, can be used for the operations described in association with the methods described herein. For example, the system 900 may be included in either or all of the warehouse management system 102 and/or the loading system 104.

The device 900 includes a processor 910, a memory 920, a storage device 930, and input/output device(s) 940. Each of the components 910, 920, 930, and 940 are interconnected using a system bus 950. The processor 910 is capable of processing instructions for execution within the device 900. In one implementation, the processor 910 is a single-threaded processor. In another implementation, the processor 910 is a multi-threaded processor. The processor 910 is capable of processing instructions stored in the memory 920 or on the storage device 930 to display graphical information for a user interface on the input/output device 940.

The memory 920 stores information within the device 900. In one implementation, the memory 920 is a computer-readable medium. In one implementation, the memory 920 is a volatile memory unit. In another implementation, the memory 920 is a non-volatile memory unit.

The storage device 930 is capable of providing mass storage for the device 900. In one implementation, the storage device 930 is a computer-readable medium. In various different implementations, the storage device 930 may be a floppy disk device, a hard disk device, an optical disk device, or a tape device.

The input/output device(s) 940 provides input/output operations for the device 900. In one implementation, the input/output device(s) 940 includes a keyboard and/or pointing device. In another implementation, the input/output device(s) 940 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semi-conductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for automatically selecting an efficient configuration for loading pallets on a vehicle, the method comprising:
    receiving pallet information for a shipment, the pallet information describing pallets to be included in the shipment, each pallet being associated with one or more pallet characteristics, wherein the one or more pallet characteristics include a pallet weight and a pallet size;
    receiving vehicle constraint information for the vehicle, the vehicle constraint information describing (i) dimensions of a cargo transportation area of the vehicle, and (ii) rules for loading pallets on the vehicle;
    determining, by a warehouse management system, candidate configurations for loading the pallets on the vehicle, wherein each candidate configuration (i) satisfies the rules for loading pallets on the vehicle, and (ii) defines, for each pallet to be included in the shipment, a respective position and orientation of the pallet on the vehicle;
    determining, by the warehouse management system, for each of the candidate configurations, a respective configuration score that represents an efficiency of the candidate configuration with respect to loading the vehicle, wherein determining the respective configuration score comprises:
        for each pallet to be included in the shipment, determining a pallet score that represents an amount of time needed for loading the pallet on the vehicle by a pallet mover according to its position and orientation as defined in the candidate configuration, with a higher cost pallet score corresponding to a greater amount of time needed for loading the pallet, wherein determining the pallet score includes assigning a high cost pallet score when the pallet is to be stacked on another pallet by the pallet mover when loading the pallet, assigning an intermediate cost pallet score when the pallet is to be turned sideways on the vehicle by the pallet mover when loading the pallet, or assigning a low cost pallet score when the pallet is to be loaded straight onto the vehicle by the pallet mover when loading the pallet, and
        aggregating the pallet scores to determine the respective configuration score, with a higher cost configuration score corresponding to a greater total amount of time needed for loading all pallets to be included in the shipment on the vehicle;
    selecting one of the candidate configurations, by the warehouse management system, based on the respective configuration score; and
    loading the vehicle according to the selected candidate configuration, wherein loading the vehicle comprises:
        providing, by the warehouse management system and to an automated storage and retrieval system, instructions to retrieve each pallet to be included in the shipment, according to a loading sequence that corresponds to the selected candidate configuration;
        delivering each pallet to be loaded on the vehicle, by the automated storage and retrieval system and to a staging area; and
        when each pallet arrives at the staging area, (i) receiving data from a pallet identification device that indicates that the pallet has arrived at the staging area, (ii) accessing the loading sequence to confirm a next slot to be filled on the vehicle corresponds to the pallet that has arrived, and (iii) loading the pallet on the vehicle when the next slot to be filled on the vehicle corresponds to the pallet.

2. The method of claim 1, wherein the rules for loading pallets on the vehicle include a first rule that specifies a maximum height of pallets to be loaded on the vehicle, and a second rule that specifies that adjacent pallets to be loaded on the vehicle are to have heights that are within a threshold percentage value of each other.

3. The method of claim 1, wherein the rules for loading pallets on the vehicle include a first rule that specifies a total weight of pallets to be loaded on the vehicle, and a second rule that specifies that a total weight of pallets to be loaded on a left side of the vehicle is to be within a threshold percentage of a total weight of pallets to be loaded on a right side of the vehicle.

4. The method of claim 1, wherein the rules for loading pallets on the vehicle include a rule that specifies two or more zones for the vehicle, with at least two of the zones being associated with different total weights of pallets to be loaded in the respective zone.

5. The method of claim 1, wherein determining candidate configurations for loading the pallets on the vehicle includes determining random permutations of different pallet loading configurations, according to the pallet size characteristic of the pallets and according to the dimensions of the cargo transportation area of the vehicle.

6. The method of claim 1, wherein the pallet is a rectangular structure that is configured to support goods and to be transported by the pallet mover.

7. The method of claim 1, further comprising:
for each pallet to be included in the shipment, assigning the pallet to a respective pallet group based on its pallet characteristics, each pallet group including pallets having pallets with pallet weights and pallet sizes that are within a threshold percentage of each other, wherein a number of pallet groups is more than one and fewer than a number of pallets to be included in the shipment.

8. The method of claim 7, wherein determining the respective configuration score that represents the efficiency of the candidate configuration with respect to loading the vehicle further comprises (i) determining the number of pallet groups for each of the candidate configurations, and (ii) for each of the candidate configurations, increasing the cost of the respective configuration score when the number of pallet groups for the candidate configuration is relatively lower than for other candidate configurations, or decreasing the cost of the respective configuration score when the number of pallet groups for the candidate configuration is relatively higher than for other candidate configurations.

9. The method of claim 7, wherein loading the vehicle according to the selected candidate configuration includes (i) identifying a first pallet to be loaded on the vehicle in a first slot according to the selected candidate configuration, (ii) receiving a second pallet, the second pallet being different from the first pallet and to be loaded in a second, different slot according to the selected candidate configuration, (iii) determining that the second pallet is assigned to a same group as the first pallet, and (iv) loading the second pallet on the vehicle in the first slot.

10. The method of claim 1, wherein selecting one of the candidate configurations includes determining an optimal loading configuration, using an iterative optimization algorithm.

11. A computer system comprising:
one or more data processing apparatuses including one or more processors, memory, and storage devices storing instructions that, when executed, cause the one or more processors to perform operations for automatically selecting an efficient configuration for loading pallets on a vehicle, the operations comprising:
receiving pallet information for a shipment, the pallet information describing pallets to be included in the shipment, each pallet being associated with one or more pallet characteristics, wherein the one or more pallet characteristics include a pallet weight and a pallet size;
receiving vehicle constraint information for the vehicle, the vehicle constraint information describing (i) dimensions of a cargo transportation area of the vehicle, and (ii) rules for loading pallets on the vehicle;
determining, by a warehouse management system, candidate configurations for loading the pallets on the vehicle, wherein each candidate configuration (i) satisfies the rules for loading pallets on the vehicle, and (ii) defines, for each pallet to be included in the shipment, a respective position and orientation of the pallet on the vehicle;
determining, by the warehouse management system, for each of the candidate configurations, a respective configuration score that represents an efficiency of the candidate configuration with respect to loading the vehicle, wherein determining the respective configuration score comprises:
for each pallet to be included in the shipment, determining a pallet score that represents an amount of time needed for loading the pallet on the vehicle by a pallet mover according to its position and orientation as defined in the candidate configuration, with a higher cost pallet score corresponding to a greater amount of time needed for loading the pallet, wherein determining the pallet score includes assigning a high cost pallet score when the pallet is to be stacked on another pallet by the pallet mover when loading the pallet, assigning an intermediate cost pallet score when the pallet is to be turned sideways on the vehicle by the pallet mover when loading the pallet, or assigning a low cost pallet score when the pallet is to be loaded straight onto the vehicle by the pallet mover when loading the pallet, and
aggregating the pallet scores to determine the respective configuration score, with a higher cost configuration score corresponding to a greater total amount of time needed for loading all pallets to be included in the shipment on the vehicle;
selecting one of the candidate configurations, by the warehouse management system, based on the respective configuration score; and
loading the vehicle according to the selected candidate configuration, wherein loading the vehicle comprises:
providing, by the warehouse management system and to an automated storage and retrieval system, instructions to retrieve each pallet to be included in the shipment, according to a loading sequence that corresponds to the selected candidate configuration;
delivering each pallet to be loaded on the vehicle, by the automated storage and retrieval system and to a staging area; and
when each pallet arrives at the staging area, (i) receiving data from a pallet identification device that indicates that the pallet has arrived at the staging area, (ii) accessing the loading sequence to confirm a next slot to be filled on the vehicle corresponds to the pallet that has arrived, and (iii) loading the pallet on the vehicle when the next slot to be filled on the vehicle corresponds to the pallet.

12. The system of claim 11, wherein the rules for loading pallets on the vehicle include a first rule that specifies a maximum height of pallets to be loaded on the vehicle, and a second rule that specifies that adjacent pallets to be loaded on the vehicle are to have heights that are within a threshold percentage value of each other.

13. The system of claim 11, wherein the rules for loading pallets on the vehicle include a first rule that specifies a total weight of pallets to be loaded on the vehicle, and a second rule that specifies that a total weight of pallets to be loaded on a left side of the vehicle is to be within a threshold percentage of a total weight of pallets to be loaded on a right side of the vehicle.

14. The system of claim 11, wherein the rules for loading pallets on the vehicle include a rule that specifies two or more zones for the vehicle, with at least two of the zones being associated with different total weights of pallets to be loaded in the respective zone.

15. The system of claim 11, wherein determining candidate configurations for loading the pallets on the vehicle includes determining random permutations of different pallet loading configurations, according to the pallet size characteristic of the pallets and according to the dimensions of the cargo transportation area of the vehicle.

16. The system of claim 11, wherein the pallet is a rectangular structure that is configured to support goods and to be transported by the pallet mover.

17. The system of claim 11, the operations further comprising:
for each pallet to be included in the shipment, assigning the pallet to a respective pallet group based on its pallet characteristics, each pallet group including pallets having pallets with pallet weights and pallet sizes that are within a threshold percentage of each other, wherein a number of pallet groups is more than one and fewer than a number of pallets to be included in the shipment.

18. The system of claim 17, wherein determining the respective configuration score that represents the efficiency of the candidate configuration with respect to loading the vehicle further comprises (i) determining the number of pallet groups for each of the candidate configurations, and (ii) for each of the candidate configurations, increasing the cost of the respective configuration score when the number of pallet groups for the candidate configuration is relatively lower than for other candidate configurations, or decreasing the cost of the respective configuration score when the number of pallet groups for the candidate configuration is relatively higher than for other candidate configurations.

19. The system of claim 17, wherein loading the vehicle according to the selected one of the candidate configuration includes (i) identifying a first pallet to be loaded on the vehicle in a first slot according to the selected candidate configuration, (ii) receiving a second pallet, the second pallet being different from the first pallet and to be loaded in a second, different slot according to the selected candidate configuration, (iii) determining that the second pallet is assigned to a same group as the first pallet, and (iv) loading the second pallet on the vehicle in the first slot.

20. The system of claim 11, wherein selecting one of the candidate configurations includes determining an optimal loading configuration, using an iterative optimization algorithm.

* * * * *